(No Model.) 3 Sheets—Sheet 2.
J. DIAMOND.
BICYCLE.
No. 473,829. Patented Apr. 26, 1892.
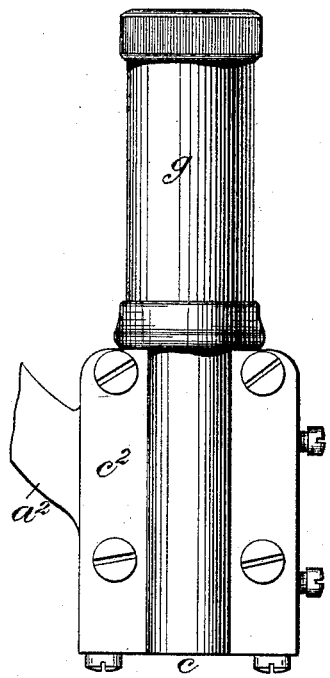
Fig. 3.
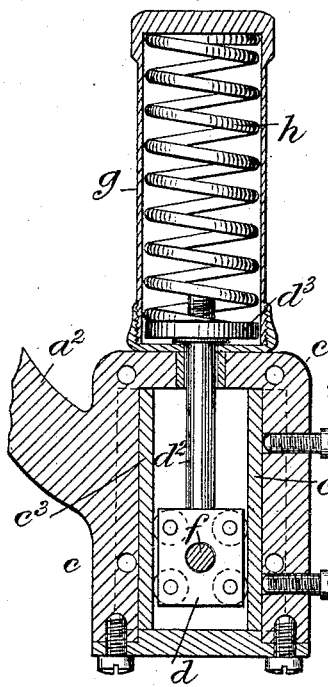
Fig. 4.
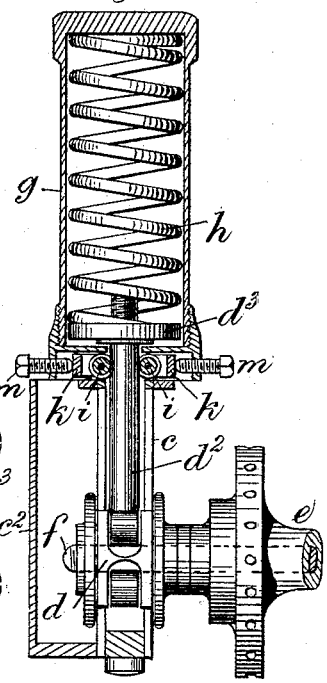
Fig. 7.
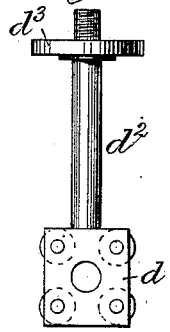
Fig. 6.
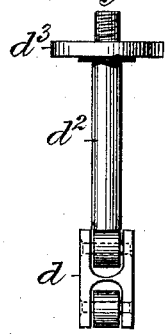
Fig. 6.A
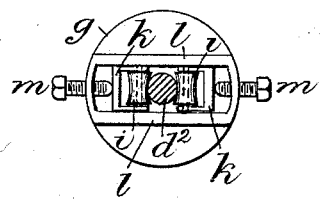
Fig. 8.
Witnesses:—
Richard Skerrett
George Shaw
Inventor:—
James Diamond

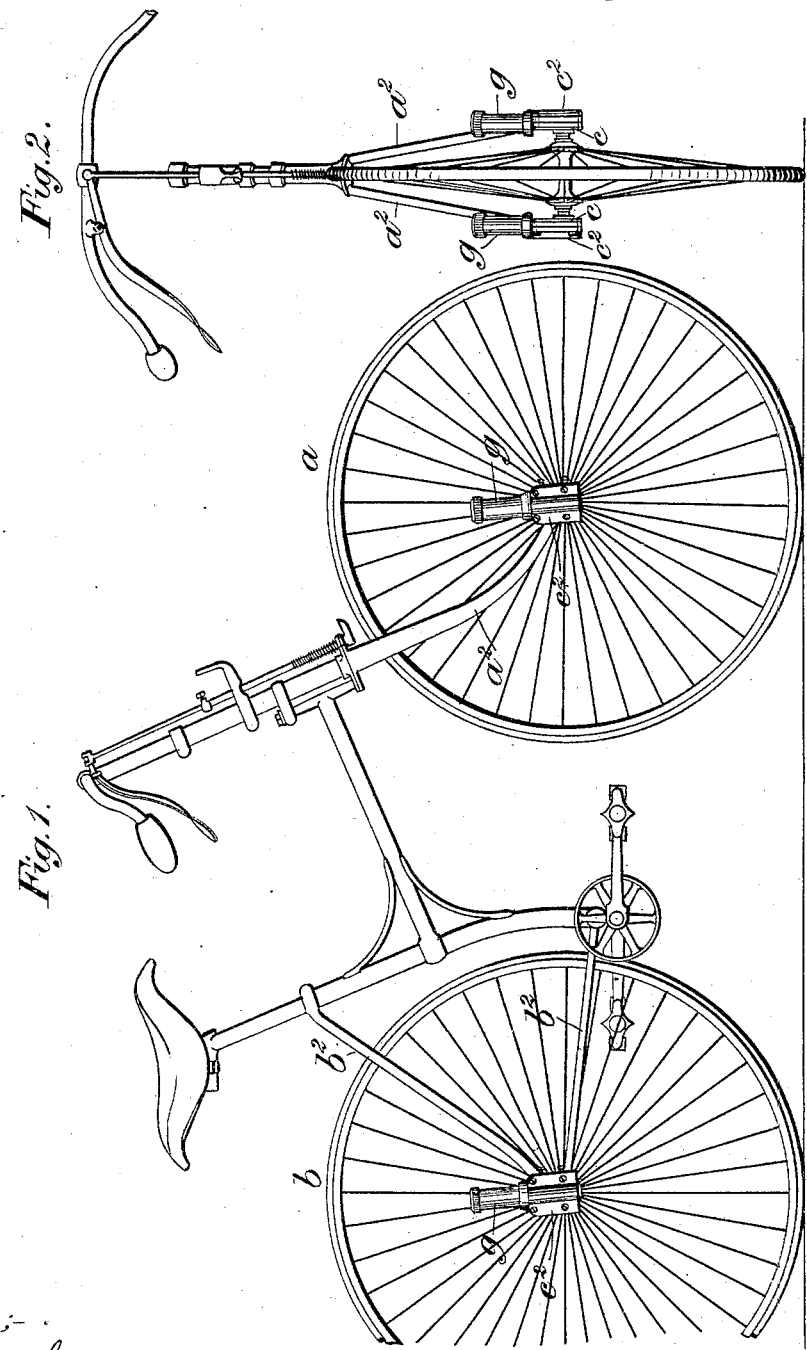

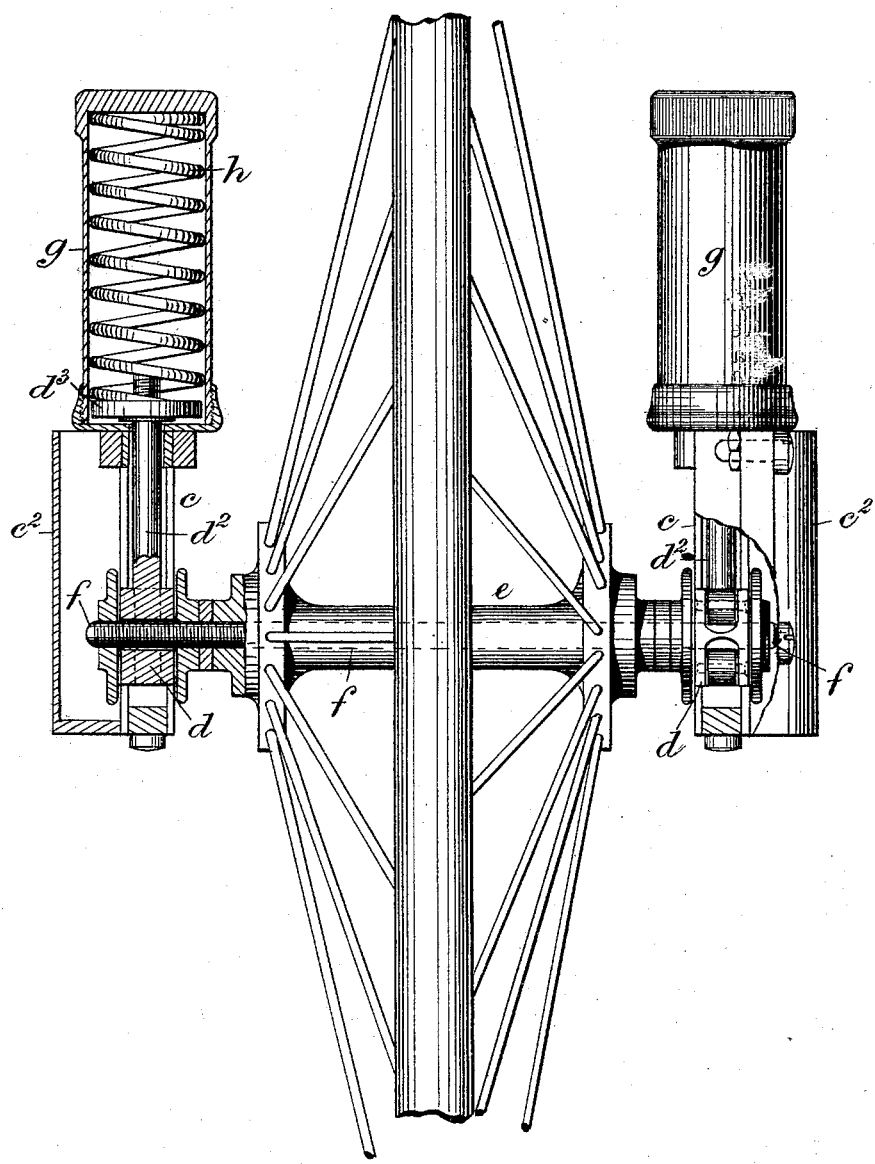

UNITED STATES PATENT OFFICE.

JAMES DIAMOND, OF ASTON, NEAR BIRMINGHAM, ASSIGNOR TO RICHARD EDMUND KING, OF BIRMINGHAM, ENGLAND.

BICYCLE.

SPECIFICATION forming part of Letters Patent No. 473,829, dated April 26, 1892.

Application filed November 11, 1891. Serial No. 411,562. (No model.)

*To all whom it may concern:*

Be it known that I, JAMES DIAMOND, a subject of the Queen of Great Britain, residing at Aston, near Birmingham, England, have invented certain new and useful Improvements in Bicycles, Tricycles, and other Velocipedes and Wheel-Carriages; and I do hereby declare that the following is a full, clear, and exact description of the invention, which will enable others skilled in the art to which it appertains to make and use the same.

My invention has for its object to destroy or lessen the vibratory or tremulous motion produced in bicycles, tricycles, and other velocipedes and wheel-carriages by obstacles or asperities in the roads over which they travel.

My invention is especially applicable to bicycles, tricycles, and other velocipedes, but is also applicable to wheel-carriages.

By the use of my invention the cushion and pneumatic tires and the spring mechanism commonly employed between the frame and the saddle of the velocipede for deadening vibration may be dispensed with; but my invention may be used in conjunction with either of the said tires and spring mechanism.

I will describe my invention as applied to a Safety bicycle having a front steering-wheel. Instead of connecting the body of the bicycle to the axle of the front steering-wheel in the ordinary way, I effect the said connection in the following manner: To each branch of the fork, I attach a rectangular frame, in which frame a block slides vertically. This block is fixed on the end of the axle on which the hub of the steering-wheel turns. The said block has at top a vertical rod terminating in a disk or piston sliding in a tube or hollow cylinder surmounting the rectangular frame carried by the fork and formed distinct from and independent of the fork or frame of the bicycle, so that such tube or hollow cylinder can be removed and replaced without disturbing the fork or frame. A strong coiled spring situated in the said tube or cylinder bears at top against the closed top of the cylinder and at bottom on the piston described. The said spring tends to keep the block to which the end of the axle is affixed at the bottom of the rectangular frame in which it slides, and this is its normal position. When, however, the wheel passes over an obstacle, the said block is suddenly raised; but its rising motion is not communicated to the fork and body of the bicycle, as the spring by which the block is pressed down yields momentarily, and the shock which would otherwise be communicated to the rider is wholly or in great part deadened. By a similar action the tremulous motion which a rough road would give to the rider is prevented.

In order to give freedom and smoothness of motion to the block to which the end of the axle is fixed, the vertical sides of the frame in which the block works are provided with anti-friction balls, against which the said block bears during its rising and falling motion. These balls are held in position by undercut holders inserted in the rectangular frame. By means of set-screws these holders can be accurately adjusted; or the sliding block may carry rollers which bear against the sides of the frame.

The arrangement of parts described is applied to the back or driving wheel as well as to the front steering-wheel, and may be applied to any of the wheels of different kinds of bicycles, tricycles, and other velocipedes and wheel-carriages the tremulous motion of which it is desired to deaden.

I will now proceed to describe with reference to the accompanying drawings the manner in which my invention is to be performed.

Figure 1 represents in side elevation, and Fig. 2 in end elevation, a Safety bicycle having a front steering-wheel, the said bicycle being provided with mechanism constructed and arranged according to my invention for deadening or lessening vibration and shocks during the traveling of the vehicle. Fig. 3 represents in side elevation, and Fig. 4 in vertical section, the anti-vibration mechanism situated at each end of the axles of the wheels drawn to a larger scale; and Fig. 5 represents, partly in end elevation and partly in vertical section, a portion of one of the wheels, its axle, and the anti-vibration mechanism at each end of the axle of the wheel, the sectional part of Fig. 5 being taken in a plane at right angles to that in which the section Fig. 4 is taken. Figs. 6 and 6$^A$ represent the sliding block, its rod, and disk or piston detached, drawn to the same scale as Figs. 3, 4, and 5. Fig. 7 represents in section, and Fig. 8 in plan, an arrangement for preserving the vertical motion of the piston-rod.

The same letters of reference indicate the same parts in the several figures of the drawings.

$a$ is the steering-wheel, and $b$ the driving-wheel, of the Safety bicycle.

$a^2$ is the fork supporting the steering-wheel $a$, and $b^2$ is the fork supporting the driving-wheel $b$. Each of the branches of the supporting-forks at the side of the wheel carries a rectangular frame $c$, in which a block $d$ slides vertically, the said frame and its contents being covered by the cap $c^2$, secured in its place by screws.

$e$ is the hub of the wheel, and $f$ the fixed axle of the same, on which it turns. On each end of the said fixed axle $f$ a sliding block $d$ is fixed, so that as the wheel rises and falls on passing over obstructions in the road the blocks $d$ $d$ similarly rise and fall in their frames $c$ $c$.

$d^2$ is a vertical rod connected to the top of the sliding block $d$, the said rod passing through a hole in the top of the frame $c$ and terminating in the disk or piston $d^3$, sliding in the tube or hollow cylinder $g$, surmounting and screwed to the frame $c$. By this construction each tube or hollow cylinder $g$ is distinct from and independent of the fork or frame of the bicycle, and consequently the tube can be removed and replaced without disturbing the fork or bicycle-frame. In the said tube or cylinder $g$ is a strong coiled spring $h$, which bears at top against the closed top of the cylinder $g$ and at bottom on the piston or disk $d^3$. By means of the spring $h$ the sliding block $d$ is pressed down nearly to the bottom of its frame, which position is its normal position. When, however, the rider mounts the bicycle, his weight carries down the frames $c$ and cylinders $g$, and the coiled springs $h$ are consequently compressed.

For giving smoothness of motion to the sliding block $d$ in its frame $c$ it is provided with rollers, as represented, which rollers slightly project from its vertical edges and bear against the adjustable plates $c^3$ at the sides of the frame $c$; or the block $d$ in its motion may bear against anti-friction balls placed in holders secured to the vertical sides of the frame $c$. I prefer, however, to use the arrangement of parts represented.

For the purpose of insuring the accurate vertical motion of the piston-rod $d$ it may bear against adjustable rollers at the top of the frame, as represented in section in Fig. 7 and a plan of under side in Fig. 8, where the rollers are marked $i$. These rollers turn in and are carried by the boxes $k$, which are adjustable and work in the guiding-frame $l$, fixed to or made in one piece with either the bottom of the cylinder $g$ or top of the frame $c$. The boxes $k$, carrying the rollers, are adjustable by the set-screws $m$ $m$.

From the foregoing description and by reference to the accompanying drawings it will be understood that when the wheels of the bicycle, to which my invention is applied, pass over an obstacle in the road the blocks on the axles of the wheels are suddenly raised; but their rising motion is not communicated to the forks and body of the bicycle, as the springs $h$ $h$, by which the blocks are pressed down, yield momentarily, and the shock which would otherwise be communicated to the rider is wholly or in great part deadened. The same action prevents the tremulus motion communicated to the wheels on passing over a rough road from being transmitted to the body of the vehicle.

Although I have described and prefer to use coiled-steel springs for the purpose of taking up or deadening the tremulus motion of the wheels, yet I do not limit myself to the use of that kind of springs, as springs of other kinds may be used with the same or nearly the same effect.

The improvements described and shown may be applied to velocipedes generally and to wheel-carriages. In applying my invention to wheel-carriages the frames in which the sliding blocks work are secured to the sides or fixed body of the carriage instead of being carried by the forks of the frame, as in the case of velocipedes.

Having now particularly described and ascertained the nature of my invention and the manner in which the same is to be performed, I declare that I claim as my invention—

1. The combination, with the fork of a bicycle having frames $c$, of tubes or hollow cylinders $g$, formed distinct from and independent of the frames and detachably mounted thereupon, the axle $f$, the blocks $d$, fixed on the end of the axle, sliding vertically in the frames, and each provided with a rod $d^2$, having a piston $d^3$, located in one of the tubes or cylinders, and a spring $h$, arranged in each tube or cylinder and acting on the piston therein, substantially as described.

2. The combination, with the fork of a bicycle having frames $c$, of tubes or cylinders $g$, mounted on the frames, the adjustable plates $c^3$, arranged in the frames, the axle $f$, the blocks $d$, provided with rollers bearing against the adjustable plates, the rods $d^2$, secured to the blocks and provided at their upper ends with pistons $d^3$, arranged in the tubes or cylinders, and the springs $h$, located in the tubes or cylinders and acting on the pistons, substantially as described.

JAMES DIAMOND. [L. S.]

Witnesses:
GEORGE SHAW,
RICHARD SKERRETT.